United States Patent Office 3,300,504
Patented Jan. 24, 1967

---

3,300,504
LOWER ALKYL ESTERS OF (SUBSTITUTED) BENZYL PIPECOLINIC ACID AND DERIVATIVES THEREOF
Karl J. Doebel, Ossining, and Heinz A. Pfenninger, Dobbs Ferry, N.Y., assignors to Geigy Chemical Corporation, Greenburgh, N.Y., a corporation of Delaware
No Drawing. Filed Jan. 6, 1964, Ser. No. 336,045
26 Claims. (Cl. 260—294.3)

This invention relates to new and useful derivatives of pipecolinic acid and particularly to lower alkyl N-(substituted)benzylpipecolinates which possess valuable pharmacological properties and are useful as intermediates for the production of physiologically active substances. The present invention pertains further to novel intermediates useful in the preparation of such compounds.

The subject lower alkyl N-(substituted)benzylpipecolinates can be represented by the following structural formula

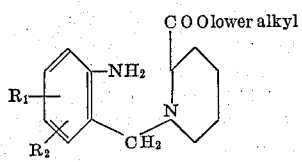

wherein $R_1$ and $R_2$ each stand for hydrogen, halogen (particularly chlorine and bromine), trifluoromethyl, cyano, lower alkyl, lower alkoxy, or methylenedioxy.

The term "lower alkyl" as used herein per se and as included in the term "lower alkoxy" means saturated monovalent aliphatic radicals of the general formula —$C_mH_{2m+1}$ wherein $m$ designates an integer of less than six and is inclusive of both straight-chain and branched-chain radicals, such as methyl, ethyl, n-propyl, isopropyl, butyl, isobutyl, tertiary butyl, n-amyl, etc.

The compounds of this invention are produced by treating lower alkylpipecolinates and appropriately substituted o-nitrobenzylhalides in such inert solvents as benzene, toluene, xylene, etc. in the presence of an excess of an acid binding agent, such as, potassium carbonate, sodium carbonate, etc. The lower alkyl o-nitrobenzylpipecolinates thus obtained can be conveniently reduced with hydrogen in the presence of Raney nickel at atmospheric pressure and room temperature to yield the corresponding lower alkyl o-aminobenzylpipecolinates. To prevent debenzylation in the hydrogenation step the hydrogenation must be stopped exactly after consumption of the theoretical amount of hydrogen.

This synthesis, which is described in greater detail by way of specific examples below, can be graphically illustrated by the following equations:

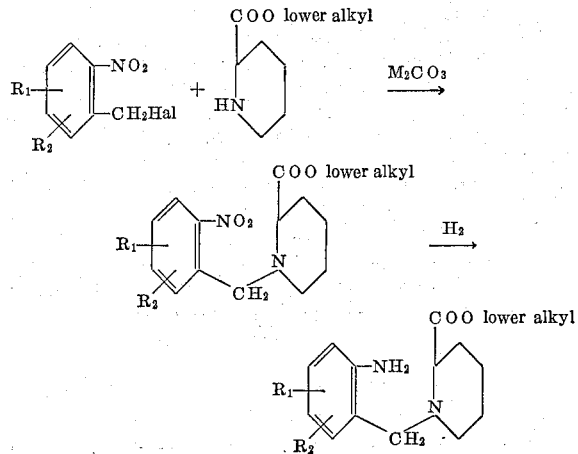

The symbols $R_1$ and $R_2$ have the significance ascribed to them hereinabove and Hal represents halogen, particularly, chlorine or bromine, and M stands for K or Na.

The present invention comprehends not only the above-described derivatives of pipecolinic acid in their free base form, but it also includes pharmaceutically acceptable non-toxic acid addition salts thereof which may be formed from said derivatives in accordance with conventional practice, by using appropriate inorganic and organic acids, such as hydrohalic acids, especially hydrochloric and hydrobromic acids, sulfuric and phosphoric acids as well as acetic, lactic, succinic, malic, aconitic, phthalic and tartaric acids.

Lower alkylpipecolinates and substituted o-nitrobenzylhalides employed as starting materials in the above described synthesis are either commercially available or are obtainable from available chemicals in accordance with preparative methods described in the prior art (as indicated in greater detail in the examples hereinbelow).

As mentioned above, the subject compounds possess valuable pharmacological properties; they can be characterized as CNS agents, particularly stimulants and tranquilizers. They also can be used as uterine-relaxant and analgesic agents.

Merely by way of illustration, it has been demonstrated in avoidance tests with gerbils, that ethyl N-(2-amino-5-chlorobenzyl)pipecolinate exhibits interesting tranquilizing activity; it is highly active by the intraperitoneal route of administration. In in vivo cat experiments this compound has been found to relax the feline uterus when given I.V. or directly into the gut; thus this compound has uterine relaxant properties.

As mentioned above, the subject compounds are also valuable as starting materials in the synthesis of other physiologically active substances. For instance, they can be saponified and simultaneously condensed by treating them with mineral acids such as hydrohalic (hydrochloric or hydrobromic) or sulfuric acids to obtain pyridobenzodiazepine compounds of the formula

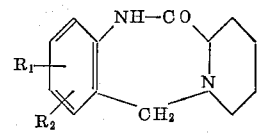

wherein $R_1$ and $R_2$ are as defined hereinabove.

These pyridobenzodiazepine derivatives are CNS depressant, anticonvulsant, muscle relaxant and hypertensive agents. They can also be used as analgesic agents.

Merely by way of illustration, 8-chloro-1,2,2,3,6,12a-hexahydro(11H)pyrido[2,1-c] - 1,4 - benzodiazepine-12-one decreases progressively the locomoter activity of mice when given in peroral doses of 50–500 mg./kg. The approximate $LD_{50}$ after I.P. administration is 250 mg./kg. This compound also causes short lasting hypertension in nembutal-anesthetized cats and possesses adrenolytic properties. 3 mg./kg. I.P. inhibits the patellar and flexor reflexes by 40–50%. While the extensor reflexes are inhibited by 100%, 10 mg./kg. I.V. inhibits the patellar reflexes by 40%, the flexor reflex by 90% and the extensor reflex by 100%.

The compounds of this invention and their acid addition salts, as well as intermediates therefor, together with the modes of synthesis, may be more fully illustrated by the following examples. The scope of the invention is, however, not limited thereto. The temperatures therein given are in degrees centigrade.

EXAMPLE 1

*Ethyl N-(o-aminobenzyl)pipecolinate*

(A) ETHYL PIPECOLINATE 200 g. of pipecolinic acid was dissolved in 1625 ml. of 5 N HCl. 8 g. of platinum oxide was added and the mixture was transferred to a 5 l. pressure flask and heated to 70°. This temperature was maintained and electronically controlled during the whole operation. The solution was shaken with hydrogen at a pressure of 5 atm. The total uptake was 340 p.s.i. (3 hours). The flask was cooled to room-temperature, hydrogen was replaced by nitrogen and the catalyst removed by filtration. Completeness of hydrogenation was controlled by U.V. measurements. The solution was then concentrated to dryness in vacuo and the crystalline pipecolinic acid hydrochloride dried by azeotropic distillation of benzene. 265 g. of pipecolinic acid hydrochloride were obtained; M.P. 265–266°. 100 g. of pipecolinic acid hydrochloride was dissolved in 1050 ml. of dry ethanol and 25 ml. of chlorosulfonic acid was added dropwise. The mixture was refluxed for 24 hours and the solvent removed in vacuo. The residue was dissolved in a small amount of water and the solution made alkaline with saturated potassium carbonate solution at 0°. The alkaline solution was saturated with sodium chloride and exhaustively extracted with benzene and ether. The combined extracts were dried over sodium sulfate, filtered and the solvent removed in vacuo. The residue was distilled to yield 80.0 g. of the desired intermediate; B.P. 93–95°/14 mm.; $n_D^{24} = 1.4550$. Only end-absorption in the U.V. spectrum was observed.

(B) ETHYL N-(o-NITROBENZYL)PIPECOLINATE 31.4 g. of ethyl pipecolinate was dissolved in 200 ml. of dry toluene. 32.0 g. of potassium carbonate was added and a solution of 34.3 g. of o-nitrobenzylchloride in 150 ml. of dry toluene was slowly dropped in while stirring. After the addition was complete, the mixture was refluxed for 12 hours. After cooling it was transferred to a beaker and an excess of 3 N hydrochloric acid was added. When the potassium carbonate was decomposed both phases were transferred to a separatory funnel and the toluene phase was extracted with 3 N hydrochloric acid. The combined extracts were washed with ethyl acetate and alkalized with NaOH to pH 10. The precipitated oily material was taken up in chloroform and the latter washed with water, dried over sodium sulfate and the solvent was removed in vacuo. The residue was distilled to give 43 g. of the desired intermediate as a yellow oil; B.P. 150–162°/0.34 mm.; $n_D^{23} = 1.5266$.

Analysis for $C_{15}H_{20}N_2O_4$ (M.W. 292.35.—Calc'd: C, 61.65%; H, 6.89%; N, 9.57%. Found: C, 61.75%; H, 7.08%; N, 9.33%.

(C) ETHYL N-(o-AMINOBENZYL)PIPECOLINATE 33.0 g. of ethyl N-(o-nitrobenzyl)pipecolinate was dissolved in 500 ml. of ethanol and hydrogenated over Raney nickel at room temperature and atmospheric pressure. Uptake of hydrogen was 2350 ml. The catalyst was removed by filtration and the solvent removed in vacuo. The residue was distilled to yield 24.7 g. of the desired final compound; B.P. 146–147°/0.5 mm.; $n_D^{23} = 1.5392$.

EXAMPLE 2

*Ethyl N-(2-amino-5-chlorobenzyl)pipecolinate*

(A) ETHYL N-(2-NITRO-5-CHLOROBENZYL) PIPECOLINATE 33.3 g. of ethyl pipecolinate was dissolved in 200 ml. of dry toluene, 34 g. of potassium carbonate was added and a solution of 44.54 g. of 2-nitro-5-chlorobenzylchloride [synthesized via the procedure described by Eichengrün and Einhorn, A. 262, 133 (1891) and Fieser and Berliner, JACS 74, (1952)] in 300 ml. of dry toluene dropped in while stirring. After the addition was complete the mixture was refluxed for 12 hours. After cooling the mixture was acidified and exhaustively extracted with 3 N HCl. The combined acid extracts were washed with ethyl acetate and then made strongly alkaline. The precipitated oil was extracted with ether, the latter washed with water, dried over sodium sulfate and removed in vacuo. The residue was distilled in vacuo to yield 45.8 g. (66% theory) of the desired intermediate as a yellow viscous oil; B.P. 153–154°/0.1 mm.

Analysis for $C_{15}H_{21}ClN_2O_2$ (M.W. 298.80).—Calc'd: C, 55.2%; H, 5.86%; Cl, 10.84%; N, 8.58%. Found: C, 55.20%; H, 6.00%; Cl, 11.03%; N, 8.59%.

(B) ETHYL N-(2-AMINO-5-CHLOROBENZYL) PIPECOLINATE 7.5 g. of ethyl N-(2-nitro-5-chlorobenzyl)pipecolinate was dissolved in 100 ml. of ethanol and hydrogenated at room temperature and atm. pressure over Raney nickel. Uptake of hydrogen was 670 ml. The catalyst was then removed by filtration and the filtrate evaporated to dryness in vacuo. The residual oil was distilled to yield 5.1 g. of the desired final compound as oil; B.P. 154°/0.3 mm.

Analysis for $C_{15}H_{21}ClN_2O_2$ (M.W. 296.80).—Calc'd: C, 60.80%; H, 7.12%; Cl, 11.93%; N, 9.45%. Found: C, 60.53%; H, 7.27%; Cl, 11.89%; N, 9.62.

The following example will illustrate the synthesis of pyridobenzodiazepine compounds starting with the subject pipecolinates.

EXAMPLE 3

*8-chloro-1,2,3,4,6,12a-hexahydro(11H)pyrido [2,1-c]-1,4 benzodiazepine-12-one*

20.0 g. of ethyl N-(2-amino-5-chlorobenzyl)pipercolinate was refluxed with 350 ml. of 3 N hydrochloric acid for 5 hours. After cooling the solution was alkalized to pH 10 and then extracted exhaustively with chloroform. The combined chloroform extracts were washed with water, dried over sodium sulfate and the solvent removed in vacuo. The residue weighed 16.32 g. and was a white crystalline solid. It could be easily recrystallized from 2B ethanol. Yield of the desired compound was 14 g.; M.P. 224–225°.

Analysis for $C_{13}H_{15}ClN_2O$ (M.W. 250.72).—Calc'd: C, 62.35%; H, 6.03%; Cl, 14.13%; N, 11.17%. Found: C, 62.8%; H, 6.29%; Cl, 14.30%; N, 11.21%.

EXAMPLE 4

*Ethyl N-(2-amino-4-cyanobenzyl)pipecolinate*

(A) ETHYL N-(2-NITRO-4-CYANOBENZYL) PIPECOLINATE 6.5 g. of 2-nitro-4-cyanobenzylbromide [prepared by the method described in Ber. 27, 2169 (1894)] was dissolved in 100 ml. of dry toluene and 27 g. of potassium carbonate was added. A solution of 4.06 g. of ethyl pipecolinate in 100 ml. of dry toluene was dropped into the first prepared boiling mixture with stirring and was refluxed for 15 hours. After cooling to room-temperature the reaction mixture was filtered and the residue was washed with ethyl acetate and the combined filtrates were transferred to a separatory funnel and first washed with water and then extracted exhaustively with 2 N hydrochloric acid. The combined extracts were then alkalized with potassium carbonate and the precipitated oil taken up in ethyl acetate. After drying over sodium sulfate the solvent was removed in vacuo and the oily residue distilled in vacuo. Yield of desired intermediate as yellow oil was 4.0 g.; B.P. 160°/0.005 mm.

(B) ETHYL N-(2-AMINO-4-CYANOBENZYL) PIPECOLINATE 8.9 g. of ethyl N-(2-nitro-4-cyanobenzyl)pipecolinate was dissolved in 200 ml. of ethanol and hydrogenated at room temperature and atm. pressure over Raney nickel.

Uptake of hydrogen was 2060 ml. The catalyst was filtered off and the filtrate concentrated to dryness in vacuo. The residue weighed 8.5 g. and crystallized; M.P. 100–106°.

EXAMPLE 5

*Ethyl N-(2-amino-4-methoxybenzyl)pipecolinate*

(A) ETHYL N-(2-NITRO-4-METHOXYBENZYL) PIPECOLINATE 8 g. of 2-nitro-4-methoxybenzylchloride was dissolved in 200 ml. of dry toluene, 20.0 g. of potassium carbonate was added and a solution of 6.3 g. ethyl pipecolinate in 20 ml. of dry toluene was dropped in at once. The mixture was stirred and refluxed for 26 hours. After cooling it was filtered and washed with ethyl acetate. The combined filtrates were exhaustively exrtacted with 3 N hydrochloric acid and the combined acid extracts were washed with ether and alkalized with 3 N sodium hydroxide. The precipitated oil was taken up in ether and the latter dried over sodium sulfate and the solvent removed in vacuo. The residue was distilled to yield a viscous yellow oil, 6.4 g., B.P. 165–167°/0.22 mm., as intermediate.

Analysis for $C_{16}H_{22}N_2O_5$ (M.W. 322.37).—Calc'd: C, 59.61%; H, 6.89%; N, 8.69. Found: C, 59.91%; H, 6.93%; N, 8.80%.

(B) ETHYL N-(2-AMINO-4-METHOXYBENZYL) PIPECOLINATE 6.45 g. ethyl N-(2-nitro-4-methoxybenzyl)pipecolinate was dissolved in 150 ml. of absolute ethanol and hydrogenated over Raney nickel at room temperature and atm. pressure. The calculated and observed uptake was 1450 ml. of hydrogen at 23°/756 mm. mercury. The catalyst was removed by filtration and the filtrate evaporated to dryness. The residual oil was distilled to yield 4.0 g., B.P. 163–165°/0.5 mm., of the desired compound.

EXAMPLE 6

*Ethyl N-(2-amino-4-trifluoromethylbenzyl)pipecolinate*

(A) ETHYL N-(2-NITRO-4-TRIFLUOROMETHYL-BENZYL)PIPECOLINATE 3.5 g. of 4-trifluoromethyl-2-nitrobenzylchloride was dissolved in 40 ml. of toluene and 6 g. of potassium carbonate was added. The reaction mixture was stirred and 2.5 g. of ethylpipecolinate in 10 ml. of toluene was added and the mixture was refluxed for 19 hours. The reaction mixture was then cooled and filtered. The potassium carbonate was washed with ethyl acetate. The combined solution of toluene and ethyl acetate was extracted with 3 N hydrochloric acid. The acid extract was cooled and alkalized with 3 N sodium hydroxide. The precipitated oily material was taken up in ether and the latter washed with water, dried over sodium sulfate and removed in vacuo. The residue was distilled to give 2.19 g. of a yellow oil, B.P. 140–141°/0.4 mm.

Analysis for $C_{16}H_{19}F_3N_2O_4$ (M.W. 360.35).—Calc'd: C, 53.33; H, 5.31; N, 7.78. Found: C, 53.92; H, 5.28; N, 7.99.

(B) ETHYL N-(2-AMINO-4-TRIFLUOROMETHYL-BENZYL)PIPECOLINATE 8.85 g. of ethyl N-(2-nitro-4-trifluoromethylbenzyl)-pipecolinate was dissolved in 150 ml. of alcohol and hydrogenated at room temperature and atm. pressure over Raney nickel. Uptake of hydrogen was 1645 ml. The catalyst was then removed by filtration and the filtrate concentrated in vacuo. The residual oil crystallized upon cooling. After recrystallization from petroleum-ether, the material melted at 77–78°; yield 7.9 g.

Analysis for $C_{16}H_{21}F_3N_2O_2$ (M.W. 330.35).—Calc'd: N, 8.48. Found: N, 8.30.

EXAMPLE 7

*Ethyl N-(2-amino-4-chlorobenzyl)pipecolinate*

(A) ETHYL N-(2-NITRO-4-CHLOROBENZYL) PIPECOLINATE 14 g. of 4-chloro-2-nitrobenzylchloride was dissolved in 400 cc. of toluene and 28 g. of potassium carbonate was added. The reaction mixture was stirred and 12 g. of ethylpipecolinate in 35 ml. of toluene was added and the mixture was refluxed for 22 hours. The reaction mixture was then cooled and filtered, the potassium carbonate was washed with ethyl acetate. The combined solution of toluene and ethyl acetate was extracted with 3 N hydrochloric acid. The acid extract was cooled and alkalized with 3 N sodium hydroxide. The precipitated oil material was taken up in ether and the latter washed with water, dried over sodium sulfate and removed in vacuo. The residue was distilled to give 7.5 g. of a yellow oil; B.P. 160–162°/0.01 mm.

Analysis for $C_{15}H_{19}ClN_2O_4$ (M.W. 326.78).—Calc'd: C, 55.14; H, 5.86; N, 8.57. Found: C, 54.98; H, 5.82; N, 8.36.

(B) ETHYL N-(2-AMINO-4-CHLOROBENZYL) PIPECOLINATE 7.4 g. of ethyl N-(2-nitro-4-chlorobenzyl)pipecolinate was dissolved in 150 ml. of alcohol and hydrogenated at room temperature and atmospheric pressure over Raney Nickel. Uptake of hydrogen was 1680 ml. The catalyst was removed by filtration and the filtrate concentrated in vacuo. The residual oil crystallized on cooling. After recrystallization from petroleum ether the material melted at 89–90°; yield 6 g.

Analysis for $C_{15}H_{21}ClN_2O_2$ (M.W. 296.79).—Calc'd: C, 60.68; H, 7.13; N, 9.44. Found: C, 60.50; H, 7.13; N, 9.57.

EXAMPLE 8

*Ethyl N-(2-amino-4-methylbenzyl)pipecolinate*

(A) ETHYL N-(2-NITRO-4-METHYLBENZYL) PIPECOLINATE 17.2 g. of ethylpipecolinate was dissolved in 400 ml. of dry toluene and 40 g. of potassium carbonate was added. The reaction mixture was then stirred. 18.6 g. of 2-nitro-4-methylbenzylchloride in 50 ml. of toluene was added and the mixture was refluxed for 24 hours. The reaction mixture was cooled and filtered. The potassium carbonate was washed with 300 ml. of ethyl-acetate. The combined solution of toluene and ethyl acetate was extracted with 700 ml. of 3 N hydrochloric acid. The hydrochloric acid solution was cooled and alkalized with 3 N sodium hydroxide. The precipitated oily material was taken up in ether and the latter washed with water, dried over sodium sulfate and removed in vacuo. The residue was distilled to give 16.5 g. of a yellow oil; B.P. 166–168°/0.6 mm.

Analysis for $C_{16}H_{22}N_2O_4$ (M.W. 306.55).—Calc'd: C, 62.72; H, 7.24; N, 9.14. Found: C, 62.53; H, 7.28; N, 9.11.

(B) ETHYL N-(2-AMINO-4-METHYLBENZYL) PIPECOLINATE 16.1 g. of ethyl N-(2-nitro-4-methylbenzyl)pipecolinate was dissolved in 250 ml. of alcohol and hydrogenated at room temperature and atmospheric pressure over Raney nickel. Uptake of hydrogen was 3775 ml. The catalyst was then removed by filtration and the filtrate evaporated to dryness in vacuo. The residual oil crystallized on cooling. After recrystallization from isopropanol, the material melted at 66–67°; yield 12 g.

Analysis for $C_{16}H_{24}N_2O_2$ (M.W. 276.37).—Calc'd: C, 69.53; H, 8.75; N, 10.14. Found: C, 69.59; H, 8.75; N, 10.23.

EXAMPLE 9

*Ethyl N-(4,5-dimethoxy-2-aminobenzyl)pipecolinate*

(A) 6-NITROVERATRYL ALCOHOL

To a solution of 21.1 g. of 6-nitroveratraldehyde (O.S. 33, 65) in 150 ml. of benzene was added at room temperature with stirring a solution of 3.36 g. of t-butylamine borane in 300 ml. of benzene. The obtained mixture was refluxed for one-half hour, then cooled to room temperature and stirred for one-half hour with 75 ml. 2 N sulfuric acid. The solid precipitate was then filtered off. The benzene layer separated from the filtrate, dried over sodium sulfate and taken to dryness and the so obtained residue combined with the already filtered-off precipitate. Yield (crude): 16 g. (75%). The product was recrystallized twice from ethanol, M.P. 145–146° C.

(B) 6-NITROVERATRYLCHLORIDE 10.65 g. of 6-nitroveratrylalcohol were dissolved in 300 ml. chloroform and 15 g. phosphorous pentachloride were added with stirring at room temperature. The reaction mixture was allowed to stand overnight at room temperature, then it was washed with water, then sodium bicarbonate solution and the chloroform solution was dried over sodium sulfate and taken to dryness. The remaining oil crystallized and was recrystallized from ethanol. Yield: 10.5 g. (91%); M.P. 90–91°.

(C) ETHYL N-(4,5-DIMETHOXY-2-NITROBENZYL) PIPECOLINATE

To a mixture of 8.3 g. of ethyl pipecolinate and 36 g. anhydrous potassium carbonate in 300 ml. of anhydrous toluene was added dropwise with stirring at the refluxing temperature a solution of 12.7 g. of 6-nitroveratrychloride in 200 ml. toluene. The obtained reaction mixture was refluxed for 8 hours with continuous stirring. After cooling to room temperature, the inorganic precipitate was filtered off and washed with ethyl acetate. The combined organic filtrates were extracted with 2 N hydrochloric acid, the aqueous extract washed with ethyl acetate, made alkaline with solid potassium carbonate at 0° C. and extracted with ethyl acetate. The organic extracts were dried over sodium sulfate and taken to dryness. The residual oil crystallized on scratching and was recrystallized from ethanol-water. Yield: 5.8 g. (46%); M.P. 68–69°.

(D) ETHYL N-(4,5-DIMETHOXY-2-AMINOBENZYL) PIPECOLINATE 17.7 g. of ethyl N-(4,5-dimethoxy-2-nitrobenzyl)pipecolinate were dissolved in 500 ml. of ethanol and hydrogenated with Raney nickel at room temperature and nearly atmospheric hydrogen pressure until the hydrogen uptake stopped. The mixture was filtered and taken to dryness. Yield: 16.25 g. (99.5%).

EXAMPLE 10

*Ethyl N-(4,5-methylenedioxy-2-aminobenzyl)pipecolinate*

(A) 4,5-METHYLENEDIOXY-2-NITROBENZYL ALCOHOL 16.2 g. of 4,5-methylenedioxy-2-nitrobenzaldehyde was dissolved in 150 ml. benzene. With stirring a solution of 2.5 g. t-butylamine borane in 300 ml. of benzene was added dropwise. The resulting mixture was refluxed for 2 hours, then cooled and hydrolyzed at room temperature, with 200 ml. sulfuric acid and then filtered. The residue was recrystallized from chloroform; yield: 15 g. (91.5%); M.P. of 122–123°.

(B) 4,5-METHYLENEDIOXY-2-NITROBENZYL CHLORIDE

To a solution of 45 g. of the alcohol from step (A) in 100 ml. of chloroform was added at room temperature with stirring 6.8 g. of phosphorous pentachloride. The resulting solution was stirred at this temperature overnight, then successively washed with water, sodium bicarbonate solution, water and the organic layer dried over sodium sulfate. The remaining residue after stripping off of the solvent was recrystallized from methanol. Yield: 36 g. (73%); M.P. of 75–76°.

(C) ETHYL N-(4,5-METHYLENEDIOXY-2-NITROBENZYL)PIPECOLINATE

To a refluxing mixture of 5.64 g. of ethyl pipecolinate hydrochloride and 40 g. of potassium carbonate in 100 ml. of xylene was added with stirring dropwise a solution of 5.2 g. of 3,4-methylenedioxy-2-nitrobenzyl chloride in 150 ml. of xylene. The resulting mixture was allowed to reflux for 15 hours, then filtered and the filtrate washed with water and extracted thoroughly with 2 N hydrochloric acid. The obtained acidic solution was treated with charcoal, made alkaline with potassium carbonate (solid) at 0° and extracted with ethyl acetate. The combined organic layers were dried over sodium sulfate, concentrated in vacuo and the obtained dark oil used directly in the next step. Yield: 5.1 g. (50.2%).

(D) ETHYL N-(4,5-METHYLENEDIOXY-2-AMINOBENZYL)PIPECOLINATE 5 g. of the oil obtained in step (C) was dissolved in 200 ml. of ethanol and hydrogenated over 5 g. Raney nickel. Calculated uptake was 1089 ml.; actual uptake: 1140 ml. in 55 minutes. The reaction mixture was then filtered and the solvent removed under reduced pressure. Yield: 4.5 g. of a dark oil.

EXAMPLE 11

*Ethyl N-(4,5-dimethyl-2-aminobenzyl)pipecolinate*

(A) ETHYL N-(2-NITRO-4,5-DIMETHYLBENZYL) PIPECOLINATE 14 g. of 4,5-dimethyl-2-nitrobenzylchloride was dissolved in 400 ml. of toluene and 30 g. of potassium carbonate was added. The reaction mixture was stirred and 13 g. of ethyl pipecolinate in 35 ml. of toluene was added and the mixture refluxed for 20 hours. The reaction mixture was then cooled and filtered, the potassium carbonate was washed with ethyl acetate. The combined solution of toluene and ethyl acetate was extracted with 3 N hydrochloric acid. The acid extract was cooled and alkalized with 3 N sodium hydroxide. The precipitated oily material was taken up in ether and the latter washed with water, dried over sodium sulfate and removed in vacuo. The residue was distilled to give 12 g. of a yellow oil; B.P. 170–171°/0.1 mm.

Analysis for $C_{17}H_{24}N_2O_4$ (M.W. 320.38).—Calc'd: C, 63.74; H, 7.55; N, 8.72. Found: C, 63.82; H, 7.45; N, 8.86.

(B) ETHYL N-(2-AMINO-4,5-DIMETHYLBENZYL) PIPECOLINATE 12 g. of ethyl N-(2-nitro-4,5-dimethylbenzyl)pipecolinate was dissolved in 300 ml. of alcohol and hydrogenated at room temperature and atmospheric pressure over Raney nickel. Uptake of hydrogen was theoretical. The catalyst was removed by filtration and the filtrate concentrated in vacuo. The residual oil crystallized on cooling. After recrystallization from hexane, the material melted at 61–62°; yield: 8.5 g.

Analysis for $C_{17}H_{26}N_2O_2$ (M.W. 270.40).—Calc'd: C, 70.30; H, 9.02; N, 9.64. Found: C, 70.42; H, 8.85; N, 9.64.

EXAMPLE 12

*Ethyl N-(4,5-dichloro-2-aminobenzyl)pipecolinate*

(A) ETHYL N-(2-NITRO-4,5-DICHLOROBENZYL) PIPECOLINATE 10.5 g. of 4,5-dichloro-2-nitrobenzylchloride was dissolved in 300 ml. of toluene and 18 g. of potassium carbonate added. The reaction mixture was stirred and 8.5 g. of ethyl pipecolinate in 25 ml. toluene was added and the mixture was stirred and refluxed for 22 hours. The reaction mixture was cooled and filtered, the potassium carbonate was washed with ethyl acetate. The combined solution of toluene and ethyl acetate was extracted with 3 N hydrochloric acid. The acid extract was cooled and alkalyzed with 3 N sodium hydroxide. The precipitated oily material was taken up in ether and the latter washed with water, dried over sodium sulfate and solvent removed in vacuo. The residue was distilled to give 5 g. of a yellow oil; B.P. 150–151°/0.06 mm.

Analysis for $C_{15}H_{18}Cl_2N_2O_4$ (M.W. 361.22).—Calc'd: C, 49.86; H, 5.02; N, 7.75. Found: C, 50.03; H, 4.91; N, 7.61.

(B) ETHYL N-(2-AMINO-4,5-DICHLOROBENZYL) PIPECOLINATE 5 g. of ethyl N-(2-nitro-4,5-dichlorobenzyl)pipecolinate was dissolved in 100 ml. of alcohol and hydrogenated at room temperature and atmospheric pressure over Raney nickel. The catalyst was removed by filtration and the filtrate concentrated in vacuo. The residual oil crystallized on cooling. After recrystallization from petroleum ether the material melted at 99–100°; yield: 11 g.

Analysis for $C_{15}H_{20}Cl_2N_2O_2$ (M.W. 331.24).—Calc'd: C, 54.37; H, 6.08; N, 8.48. Found: C, 54.10; H, 5.95; N, 8.33.

EXAMPLE 13

*Ethyl N-(2-acetamido-5-chlorobenzyl)pipecolinate*

8.91 g. of ethyl N-(2-amino-5-chlorobenzyl)pipecolinate (Ex. 2) was dissolved in 100 ml. of benzene and 3.7 ml. of acetic anhydride was added. The obtained clear solution was heated up to the boiling point and then allowed to stand at room temperature for 15 hours. The reaction mixture was then washed with 30% potassium carbonate and saturated sodium chloride solution and dried over sodium sulfate. The solvent was evaporated under reduced pressure. The residue crystallized. Yield: 10.0 g. (98.5%). It was recrystallized from ethanol to a white crystalline solid; M.P. 115–116°.

Analysis for $C_{17}H_{23}ClN_2O_3$ (M.W. 338.83).—Calc'd: C, 60.27; H, 6.84; N, 8.27; Cl, 10.47. Found: C, 60.20; H, 6.91; N, 8.22; Cl, 10.71.

This compound has tranquilizing properties.

EXAMPLE 14

*N-(2-amino-5-chlorobenzyl)piperidine-2-methanol*

The solution of 8.01 g. of ethyl N-(2-amino-5-chlorobenzyl)pipecolinate (Ex. 2) in 150 ml. of dry isopropyl ether was added rapidly to a boiling stirred suspension of 2 g. of lithium aluminum hydride in 200 ml. of dry isopropyl ether. The obtained mixture was refluxed for 5 hours, then allowed to stir at room temperature overnight. Then the reaction mixture was cooled to 0° and decomposed by subsequent addition of 2 ml. of water, 2 ml. of 15% sodium hydroxide, 6 ml. of water and filtered after being stirred for 30 minutes at 0°. The residue was washed thoroughly with isopropyl ether and the combined filtrates concentrated in vacuo. The residual oil (6.5 g.) was dissolved in hot cyclohexane and filtered. On cooling, a white, crystalline precipitate formed which was filtered off and recrystallized from cyclohexane. Yield: (pure) 2.8 g. (41%); M.P. 102–103°.

Analysis for $C_{13}H_{19}ClN_2O$ (M.W. 254.76).—Calc'd: C, 61.28; H, 7.52; N, 11.00; Cl, 13.91. Found: C, 61.10; H, 7.45; N, 10.78; Cl, 13.62.

This compound has been found in cat experiments to affect the blood pressure.

EXAMPLE 15

*Ethyl N-(5-chloro-2-ureidobenzyl)pipecolinate*

1.5 g. of ethyl N-(2-amino-5-chlorobenzyl)pipecolinate (Ex. 2) was dissolved in 5 ml. of acetic acid and a solution of 0.44 g. of potassium cyanate in 6 ml. of water was added at room temperature. The resulting solution was allowed to stand at this temperature for 24 hours. Very soon, the urea began to crystallize out and was filtered off after the above mentioned time period. The already very pure, white residue (weight 1.5 g., 89%) was recrystallized from ethanol to white crystals; M.P. 174–175°.

Analysis for $C_{16}H_{22}ClN_3O_3$ (M.W. 339.82).—Calc'd: C, 56.55; H, 6.52; N, 12.37; Cl, 10.44. Found: C, 56.73; H, 6.55; N, 12.17; Cl, 10.44.

This compound has tranquilizing properties.

This application is a continuation-in-part of our application Serial No. 247,335, filed December 26, 1962.

What is claimed is:

1. A compound of the formula

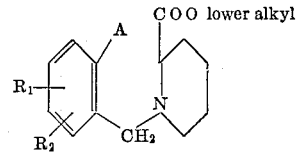

wherein $R_1$ and $R_2$ are members selected from the group consisting of hydrogen, halogen, trifluoromethyl, cyano, lower alkyl, lower alkoxy and methylenedioxy; and
A is chosen from the group consisting of nitro and amino.

2. A compound of the formula

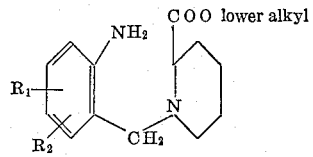

wherein $R_1$ and $R_2$ are members selected from the group consisting of hydrogen, halogen, trifluoromethyl, cyano, lower alkyl, lower alkoxy and methylenedioxy.

3. A compound of the formula

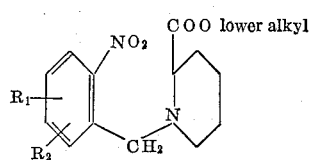

wherein $R_1$ and $R_2$ are members selected from the group consisting of hydrogen, halogen, trifluoromethyl, cyano, lower alkyl, lower alkoxy and methylenedioxy.

4. Ethyl N-(o-nitrobenzyl)pipecolinate.
5. Ethyl N-(o-aminobenzyl)pipecolinate.
6. Ethyl N-(2-nitro-5-chlorobenzyl)pipecolinate.
7. Ethyl N-(2-amino-5-chlorobenzyl)pipecolinate.
8. Ethyl N-(2-nitro-4-methylbenzyl)pipecolinate.
9. Ethyl N-(2-amino-4-methylbenzyl)pipecolinate.
10. Ethyl N-(2-nitro-4-methoxybenzyl)pipecolinate.
11. Ethyl N-(2-amino-4-methoxybenzyl)pipecolinate.
12. Ethyl N-(4,5-dimethoxy-2-aminobenzyl)pipecolinate.
13. Ethyl N-(4,5-dimethoxy-2-nitrobenzyl)pipecolinate.
14. Ethyl N-(2-amino-4-trifluoromethylbenzyl)pipecolinate.
15. Ethyl N-(2-nitro-4-trifluoromethylbenzyl)pipecolinate.
16. Ethyl N-(2-amino-4-chlorobenzyl)pipecolinate.
17. Ethyl N-(2-nitro-4-chlorobenzyl)pipecolinate.
18. Ethyl N-(4,5-dimethyl-2-aminobenzyl)pipecolinate.
19. Ethyl N-(4,5-dimethyl-2-nitrobenzyl)pipecolinate.
20. Ethyl N-(4,5-dichloro-2-aminobenzyl)pipecolinate.
21. Ethyl N-(4,5-dichloro-2-nitrobenzyl)pipecolinate.
22. Ethyl N-(4,5-methylenedioxy-2-aminobenzyl)pipecolinate.
23. Ethyl N-(4,5-methylediioxy-2-nitrobenzyl)pipecolinate.
24. Ethyl N-(2-acetamido-5-chlorobenzyl)pipecolinate.

25. N-(2-amino-5-chlorobenzyl)piperidine-2-methanol.
26. Ethyl N-(5-chloro-2-ureidobenzyl)pipecolinate.

References Cited by the Examiner

UNITED STATES PATENTS 2,546,652　3/1951　Plati et al. _____ 260—294.3 X

OTHER REFERENCES

Hill et al., Journal Organic Chemistry, vol. 19, pages 1803–1806 (1954).

WALTER A. MODANCE, *Primary Examiner.*

A. D. SPEVACK, *Assistant Examiner.*